(12) United States Patent
Takamatsu et al.

(10) Patent No.: US 6,179,475 B1
(45) Date of Patent: Jan. 30, 2001

(54) HOLDER FOR CONNECTING OPTICAL CONNECTORS, AND OPTICAL CONNECTOR CONNECTING STRUCTURE

(75) Inventors: Michihiro Takamatsu; Yoshinori Tochiki, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/225,211

(22) Filed: Jan. 4, 1999

(30) Foreign Application Priority Data

Aug. 11, 1998 (JP) .................................................. 10-226897

(51) Int. Cl.[7] ....................................................... G02B 6/36
(52) U.S. Cl. ................................. 385/53; 385/88; 385/92
(58) Field of Search ........................... 385/53–56, 58–60, 385/62–63, 73, 88–92; 359/808–826

(56) References Cited

U.S. PATENT DOCUMENTS

| | | | |
|---|---|---|---|
| 5,129,024 | * | 7/1992 | Honma ..................................... 385/53 |
| 5,220,703 | * | 6/1993 | Kanayama et al. ..................... 385/53 |
| 5,600,746 | * | 2/1997 | Arnett ...................................... 385/53 |
| 5,784,513 | * | 7/1998 | Kuribayashi et al. .................. 385/88 |
| 5,879,173 | * | 3/1999 | Poplawski et al. ..................... 385/92 |
| 5,940,563 | * | 8/1999 | Kobayashi et al. ..................... 385/92 |
| 5,980,118 | * | 11/1999 | Henningsson et al. ................. 385/92 |
| 6,027,252 | * | 2/2000 | Erdman et al. ......................... 385/53 |

FOREIGN PATENT DOCUMENTS

| | | |
|---|---|---|
| 5-88043 | 4/1993 | (JP) . |
| 5-88044 | 4/1993 | (JP) . |
| 9-90150 | 4/1997 | (JP) . |

OTHER PUBLICATIONS

English Abstract of Japanese application 5–88043.
English Abstract of Japanese application 5–88044.
English Abstract of Japanese application 9–90150.

* cited by examiner

*Primary Examiner*—Thong Nguyen
(74) *Attorney, Agent, or Firm*—Staas & Halsey LLP

(57) ABSTRACT

An optical connector connecting structure capable of achieving quick and easy connection of optical connectors of different types. The optical connector connecting structure includes a holder fixed to a communication device and having a pair of optical connector holding members and an adapter insertion opening, and a first optical connector held by the optical connector holding members. The optical connector connecting structure further includes an adapter inserted through the opening of the holder and detachably mounted to the first optical connector.

16 Claims, 26 Drawing Sheets

HOLDER FOR CONNECTING OPTICAL CONNECTORS, AND OPTICAL CONNECTOR CONNECTING STRUCTURE

BACKGROUND OF THE INVENTION

1. Field of the Invention

The present invention relates to an optical connector connecting structure for connecting an internal optical connector in a communication device to an external optical connector outside of the communication device.

2. Description of the Related Art

In the field of optical communication or the like, an optical connector is used to detachably connect optical fibers used as a transmission line. This kind of optical connector has such a configuration as to coaxially butt the polished end faces of optical fibers. If the optical fibers connected by the optical connector are misaligned, a connection loss increases, and it is therefore required for the optical connector to prevent such misalignment in butting the end faces of the optical fibers.

Various types of optical connectors specified by JIS, IEC, etc. are present as the optical connector for use in optical fiber communication. Therefore, an adapter capable of converting to a different type is used to connect different types of optical connectors. Such an adapter is required to connect an internal optical connector in a communication device and an external optical connector outside of the communication device. Conventionally, such an adapter is fixed by screws to a mounting bracket in the communication device.

An adapter for connecting optical connectors of the same type and an adapter for connecting optical connectors of different types are different in structure. Accordingly, in the case that the adapter for connecting the optical connectors of the same type is fixed by screws to the communication device and if the external optical connector is different in type from the internal optical connector, it is necessary to fix an adapter suitable for supporting the external optical connector. In this case, the following troublesome work for exchange of the adapters is conventionally carried out. That is, the adapter previously fixed to the communication device is first removed by loosening the screws, and the adapter supporting the external optical connector is next fixed to the communication device by the screws.

SUMMARY OF THE INVENTION

It is therefore an object of the present invention to provide an optical connector connecting structure for a communication device which allows easy exchange of an adapter according to an external optical connector to be connected.

In accordance with an aspect of the present invention, there is provided a holder for optically connecting first and second optical connectors through an adapter, comprising a holding means for elastically holding the first optical connector; and a locking means for locking the adapter so as to prevent removal of the adapter from the first optical connector in the condition where the first optical connector is connected with the adapter.

The holder has a plurality of holes for fixing the holder to a printed wiring board, so that the holder can be fixed by means of rivets or the like through the holes. The adapter can be replaced by another adapter according to the second optical connector to be connected to the first optical connector, and the new adapter can be mounted to the first optical connector.

In accordance with another aspect of the present invention, there is provided an optical connector connecting structure for optically connecting first and second optical connectors through an adapter to obtain an assembly and fixing the assembly to a printed wiring board, comprising a holding means fixed to the printed wiring board for elastically holding the first optical connector; and a locking means fixed to the printed wiring board for locking the adapter so as to prevent removal of the adapter from the first optical connector in the condition where the first optical connector is connected with the adapter.

In accordance with a further aspect of the present invention, there is provided an optical connector connecting structure for a communication device, comprising a holder fixed to the communication device and having a pair of optical connector holding members and an adapter insertion opening; a first optical connector held by the optical connector holding members; and an adapter inserted through the opening of the holder and detachably mounted to the first optical connector.

With this configuration, the first optical connector can be held by the holder fixed to the communication device. Further, the adapter can be replaced by another adapter according to a second optical connector to be connected to the first optical connector, and the new adapter can be mounted to the first optical connector. Thus, unlike the prior art connecting structure in which the adapter is fixed, the adapter in the present invention can be detachably mounted to the first optical connector through the opening of the holder. Accordingly, the adapter can be selectively mounted according to an external optical connector to be connected to the first optical connector, and the two optical connectors can be easily connected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
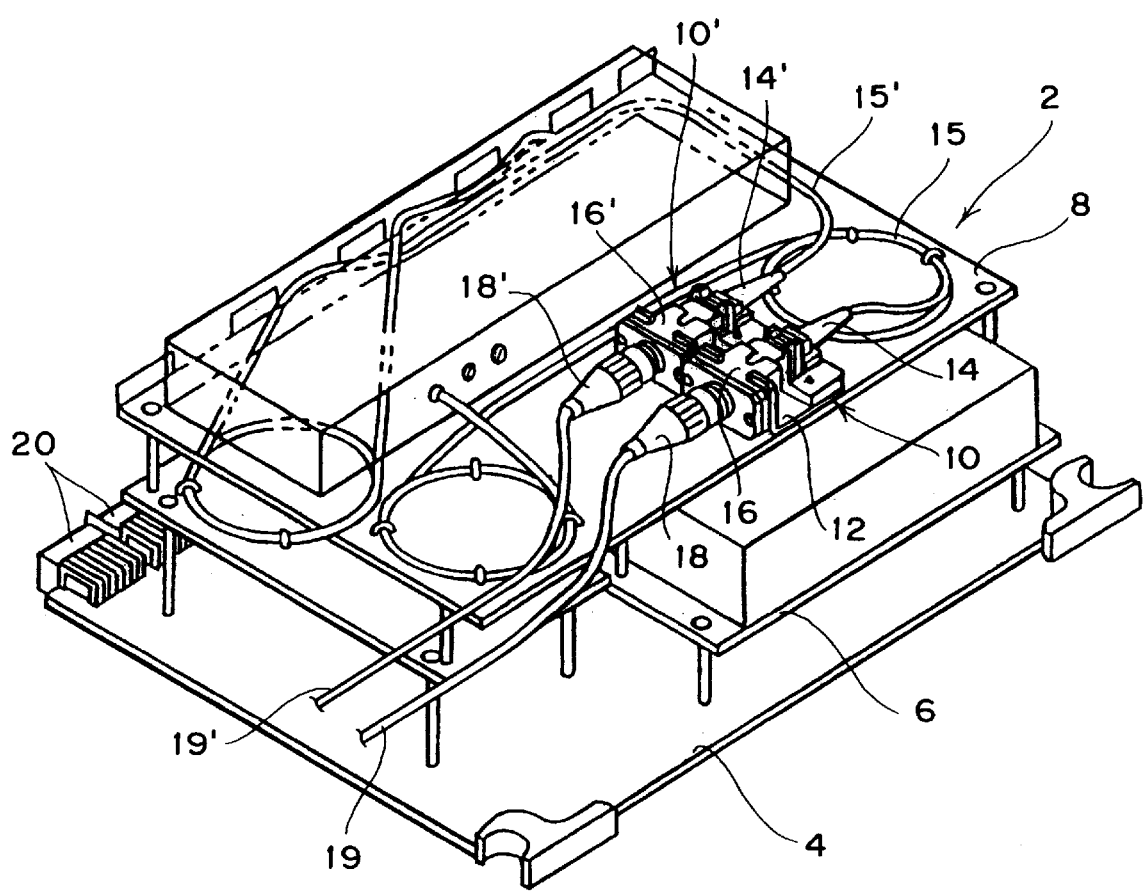
FIG. 1 is a perspective view of a package for a communication device.

Referring to FIG. 1, there is shown a perspective view of a package 2 for a communication device (not shown). The package 2 has a three-stage configuration having three printed wiring boards 4, 6, and 8. The package 2 is adapted to be mounted into a shelf (not shown) to configure the communication device. An optical connector connecting structure 10 according to a first preferred embodiment of the present invention is mounted on the printed wiring board 8.

The optical connector connecting structure 10 includes a holder 12 fixed to the printed wiring board 8.

The holder 12 has a pair of holding portions (optical connector holding members) and an adapter insertion opening. A first optical connector (internal optical connector) 14 is held between a pair of holding portions of the holder 12. An adapter 16 is inserted through the opening of the holder 12 and engaged with the first optical connector 14. A second optical connector (external optical connector) 18 is inserted in the adapter 16. Accordingly, the second optical connector 18 is connected through the adapter 16 to the first optical connector 14.

The first optical connector 14 is connected through an optical fiber cord 15 to an optical module (not shown) in the communication device. On the other hand, the second optical connector 18 is connected through an optical fiber cord 19 to an optical module (not shown) outside of the communication device. Another optical connector connecting structure 10' having the same configuration as that of the optical connector connecting structure 10 is also mounted on the printed wiring board 8. In the optical connector connecting structure 10' the same parts as those of the optical connector connecting structure 10 are denoted by the same reference numerals with primes ('), and the description thereof will be omitted herein. In FIG. 1, reference numeral 20 denotes an electrical connector of the package 2 to be connected to a backboard connector (not shown).

The optical connector connecting structure 10 according to the first preferred embodiment of the present invention will now be described in more detail with reference to FIGS. 2 to 4. The holder 12 has a pair of holding portions 22 and a gate portion 24. Each holding portion 22 is formed of resin and has elasticity. The gate portion 24 has an opening 26 for insertion of the adapter 16 (or 48). By forcing down the first optical connector 14 between a pair of holding portions 22 against their elastic forces, the first optical connector 14 is held by the elasticity of the holding portions 22. The first optical connector 14 has a ferrule 28 and a projection 30.

Figure 3:
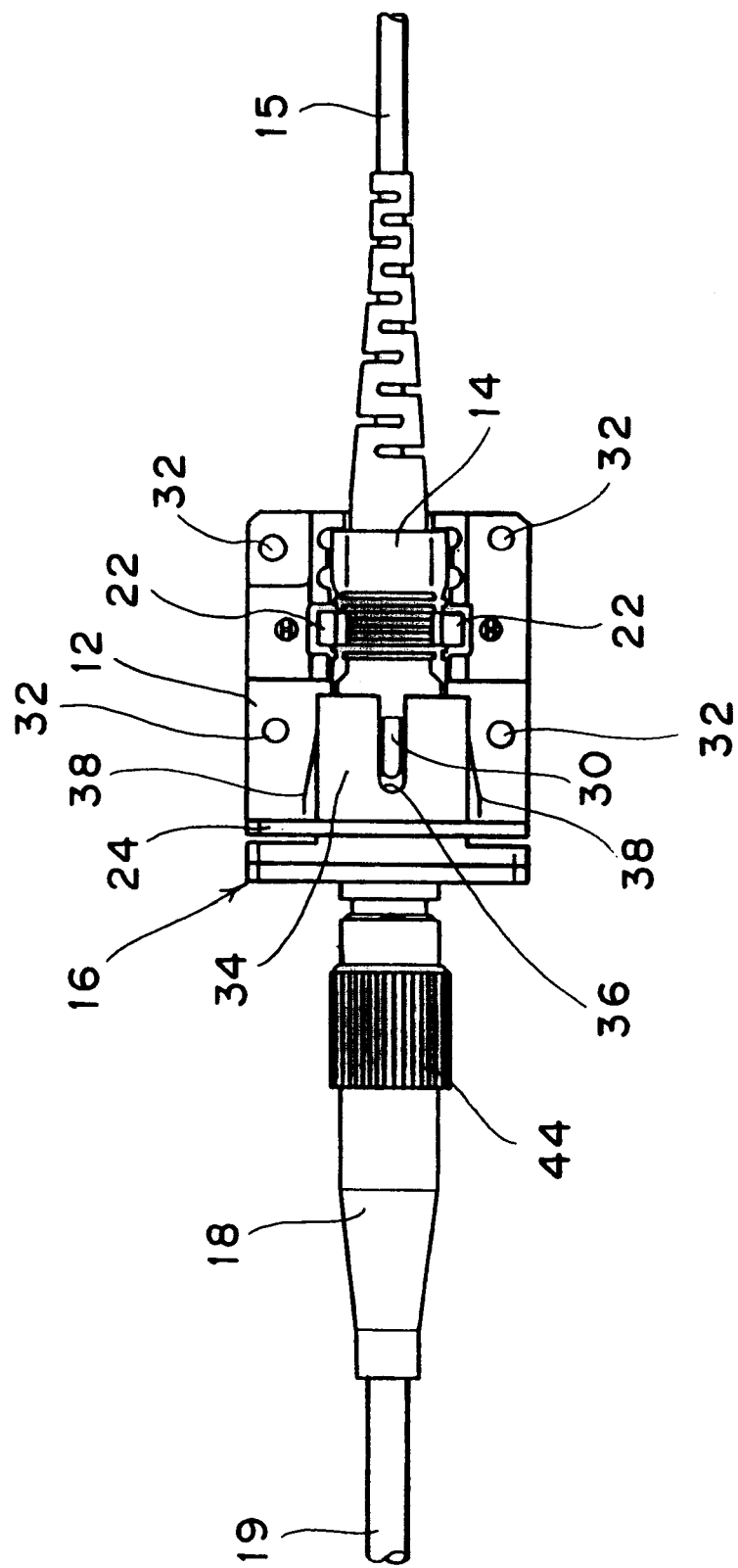
FIG. 3 is a plan view of the optical connector connecting structure according to the first preferred embodiment in its assembled condition.

The holder 12 has four holes 32 for fixing the holder 12 to the printed wiring board 8 by means of rivets or the like (see FIG. 3). The first optical connector 14 is an SC connector. The adapter 16 is an adapter for converting the SC connector into an FC connector. Therefore, the adapter 16 has an SC housing 34 and an FC housing 40 opposite to the SC housing 34. The SC housing 34 is formed with a notch 36 for engaging the projection 30 of the first optical connector 14 and a pair of leaf springs 38 for maintaining the engagement of the adapter 16 with the first optical connector 14. The FC housing 40 is a cylindrical member formed with an external screw thread 42.

The second optical connector 18 is an FC connector, which has a ferrule 46 and a nut 44 for threadedly engaging with the external screw thread 42 of the FC housing 40 of the adapter 16. In the case of connecting the second optical connector (FC connector) 18 to the first optical connector (SC connector) 14, the adapter 16 is used. That is, the SC housing 34 of the adapter 16 is inserted through the opening 26 of the holder 12 and engaged with the first optical connector 14.

As best shown in FIG. 3, the notch 36 of the adapter 16 is engaged with the projection 30 of the first optical connector 14, thus mounting the adapter 16 to the first optical connector 14. In this condition, a pair of leaf springs 38 of the adapter 16 interfere with the gate portion 24 of the holder 12, thereby preventing undue withdrawal of the adapter 16 from the holder 12. In this case, the gate portion 24 functions as locking means for preventing withdrawal of the adapter 16 from the holder 12.

Figure 4:
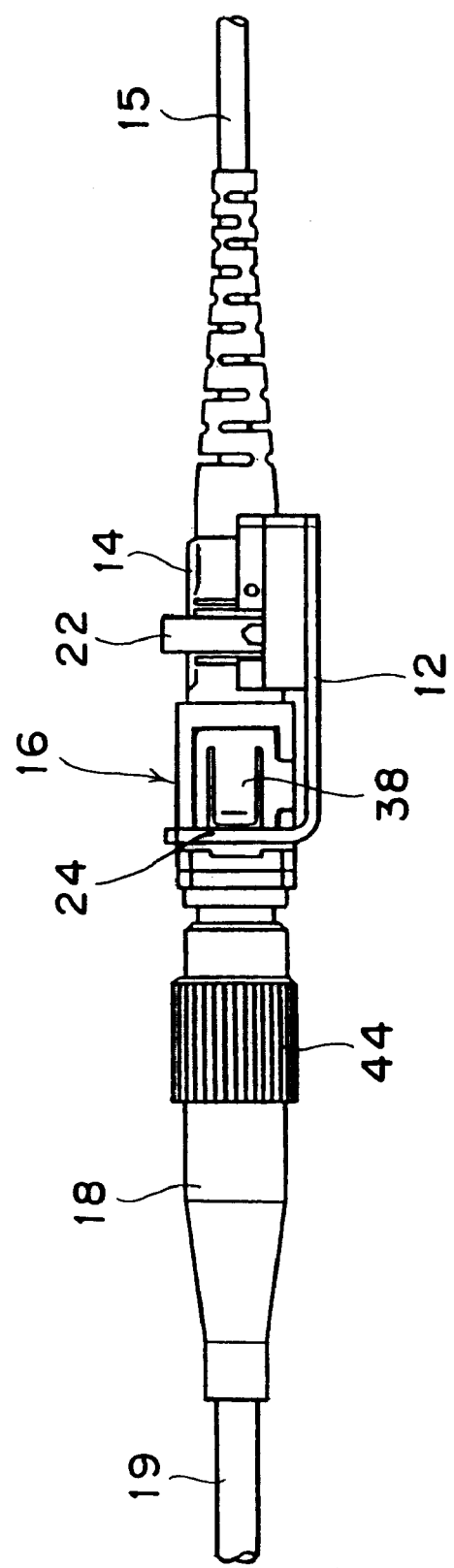
FIG. 4 is an elevational view of FIG. 3.

In this condition that the adapter 16 is connected to the first optical connector 14, the second optical connector (FC connector) 18 is inserted into the FC housing 40 of the adapter 16, and the nut 44 is secured to the external screw thread 42, thereby mounting the second optical connector 18 to the adapter 16 as shown in FIGS. 3 and 4. In this condition, the ferrule 28 of the first optical connector 14 and the ferrule 46 of the second optical connector 18 are in abutment against each other, thereby connecting optical fibers (not shown) in the ferrules 28 and 46 to each other.

Figure 2:
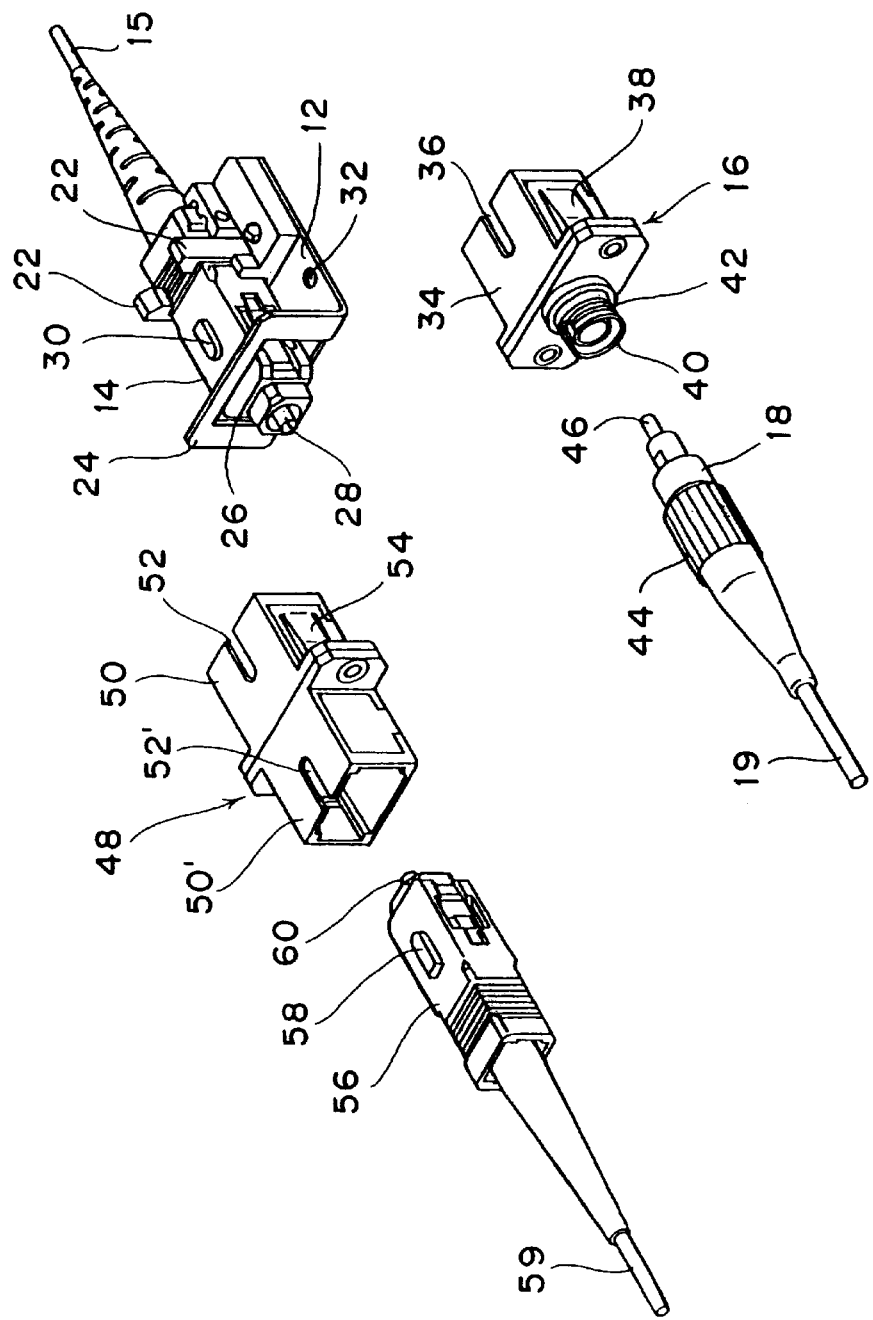
FIG. 2 is an exploded perspective view of an optical connector connecting structure according to a first preferred embodiment of the present invention.

Referring to FIG. 2, reference numeral 48 denotes another type of adapter for connecting optical connectors of the same type. The adapter 48 is symmetrically formed in respect of its longitudinal direction except a pair of leaf springs 54. That is, the adapter 48 is composed of a pair of SC housings 50 and 50' symmetrical in shape with each other except that the SC housing 50 has the leaf springs 54. More specifically, the SC housing 50 of the adapter 48 has a notch 52 similar to the notch 36 of the SC housing 34 of the adapter 16 and has the leaf springs 54 similar to the leaf springs 38 of the SC housing 34 of the adapter 16, whereas the SC housing 50' of the adapter 48 has a notch 52' similar to the notch 52, but it has no leaf springs.

Reference numeral 56 denotes a third optical connector 56 which is an SC connector having a projection 58 and a ferrule 60. The third optical connector 56 is connected through an optical fiber cord 59 to an optical module (not shown) outside of the communication device. In the case of connecting the third optical connector 56 to the first optical connector 14, the adapter 48 is used. That is, the adapter 16 is first removed from the holder 12 in the condition where the leaf springs 38 is pressed. Thereafter, the SC housing 50 of the adapter 48 is inserted through the opening 26 of the holder 12 and mounted to the first optical connector 14. In this condition that the adapter 48 is connected with the first optical connector 14, the third optical connector 56 is inserted into the SC housing 50' of the adapter 48 to thereby make the ferrule 60 of the third optical connector 56 abut against the ferrule 28 of the first optical connector 14. Thus, an optical fiber (not shown) in the ferrule 60 of the third optical connector 56 is connected to the optical fiber (not shown) in the ferrule 28 of the first optical connector 14.

In the case of testing the communication device in a factory, the adapter 48 is rotated 180° to mount the SC housing 50' to the first optical connector 14. Because the SC housing 50' has no leaf springs, the adapter 48 can be freely mounted and demounted in such direction with respect to the first optical connector 14, thereby allowing easy testing of the communication device. However, in shipping the communication device from the factory, the SC housing 50 having the leaf springs 54 is mounted to the first optical connector 14, so as to prevent undue removal of the adapter 48 from the holder 12 at a destination.

Figure 5A:
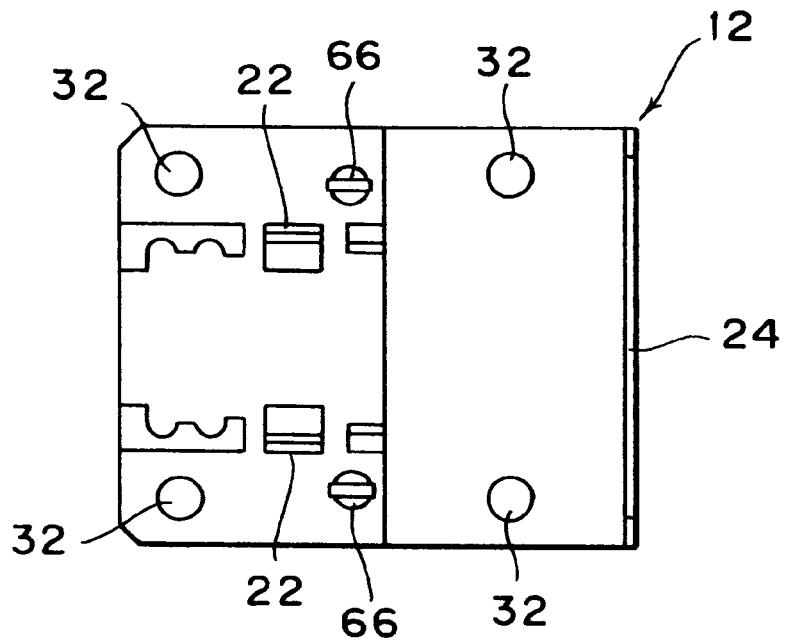
FIG. 5A is a plan view of a holder in the first preferred embodiment.
Figure 5B:
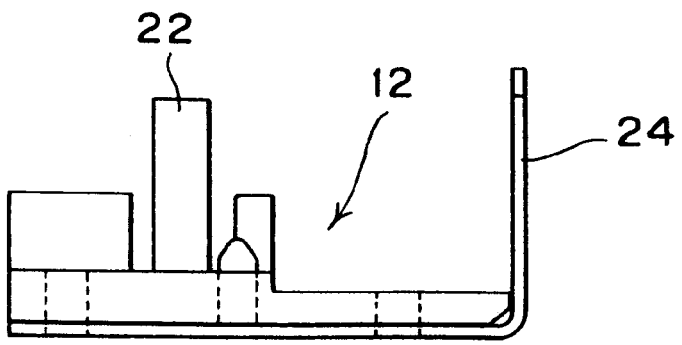
FIG. 5B is an elevational view of FIG. 5A.
Figure 6A:
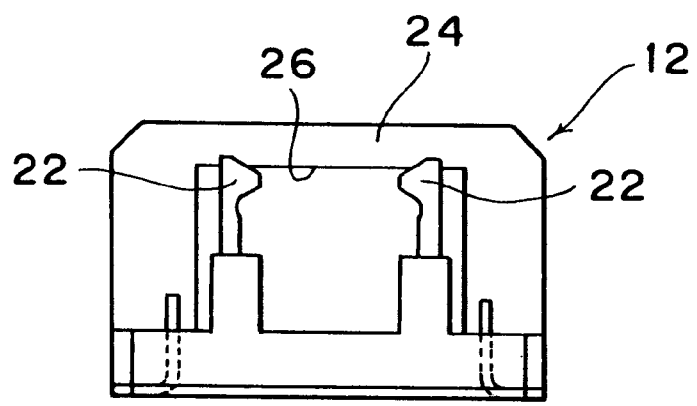
FIG. 6A is a left side view of FIG. 5A.
Figure 6B:
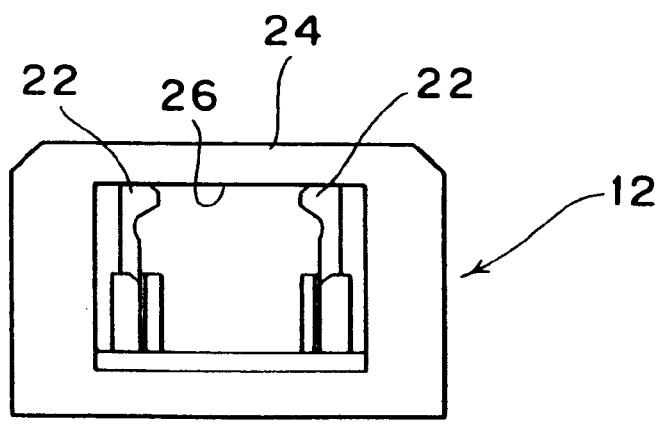
FIG. 6B is a right side view of FIG. 5A.

The holder 12 in the first preferred embodiment of the present invention will now be described in more detail with reference to FIGS. 5A to 10B. The holder 12 is composed of a holding member 62 shown in FIGS. 7A to 8B and a base member 64 shown in FIGS. 9A to 10B. FIG. 5A is a plan view of the holder 12 in its assembled condition obtained by mounting the holding member 62 on the base member 64; FIG. 5B is an elevational view of FIG. 5A; FIG. 6A is a left side view of FIG. 5A; and FIG. 6B is a right side view of FIG. 5A.

Figure 7A:
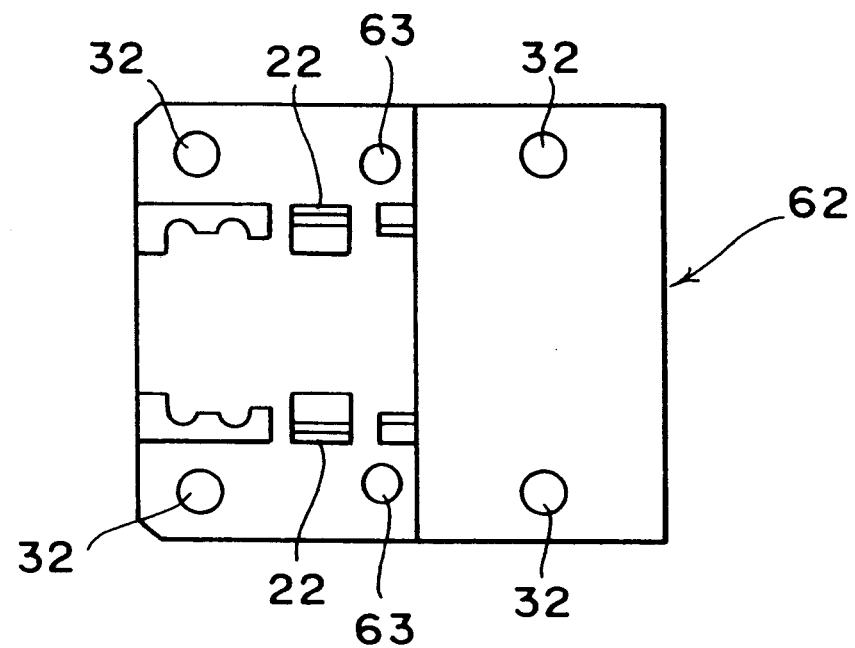
FIG. 7A is a plan view of a holding member of the holder in the first preferred embodiment.
Figure 7B:
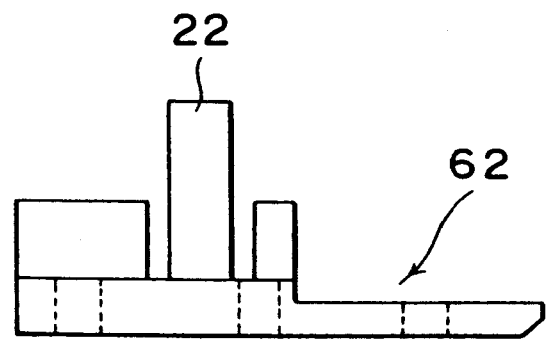
FIG. 7B is an elevational view of FIG. 7A.
Figure 8A:
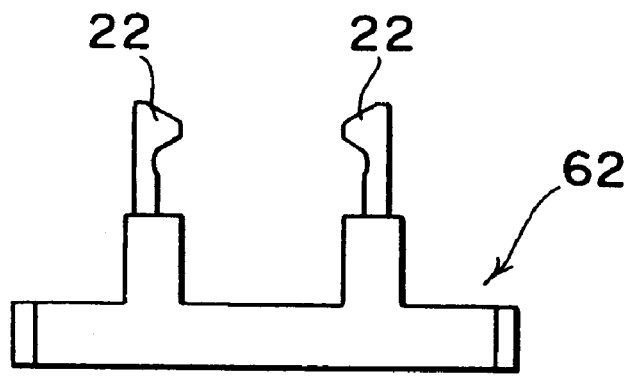
FIG. 8A is a left side view of FIG. 7A.
Figure 8B:
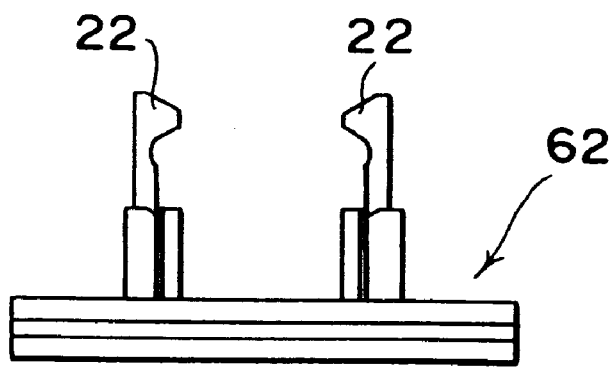
FIG. 8B is a right side view of FIG. 7A.
Figure 9A:
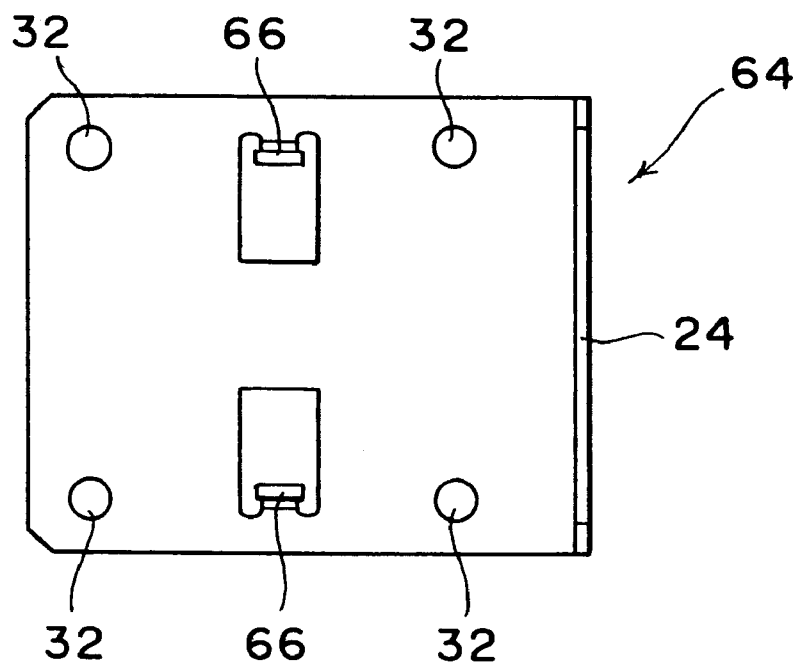
FIG. 9A is a plan view of a base member of the holder in the first preferred embodiment.
Figure 9B:
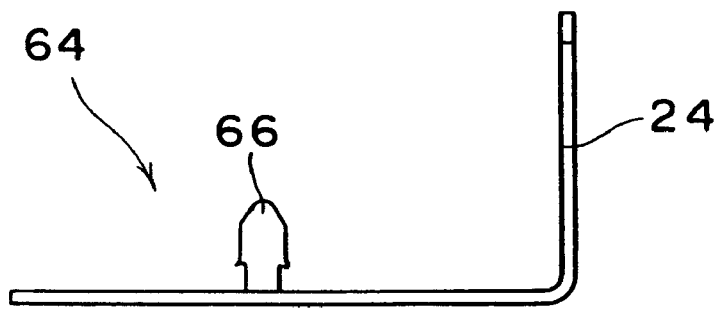
FIG. 9B is an elevational view of FIG. 9A.
Figure 10A:
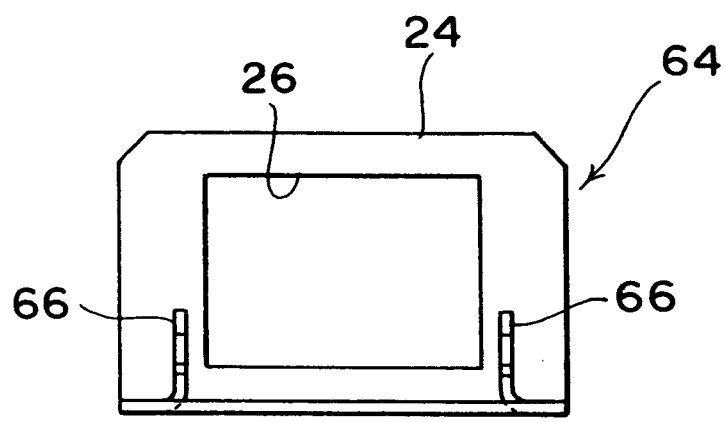
FIG. 10A is a left side view of FIG. 9A.
Figure 10B:
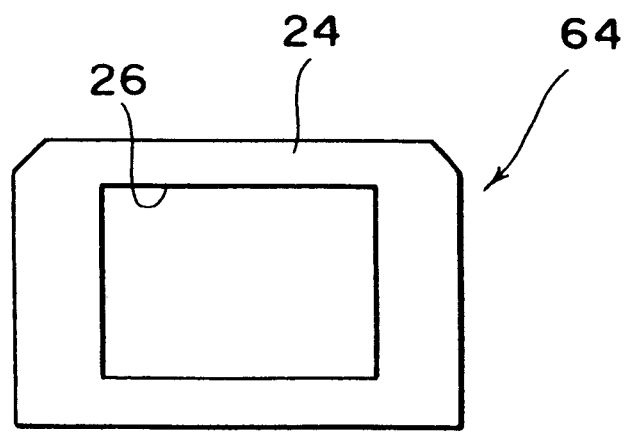
FIG. 10B is a right side view of FIG. 9A.
Figure 11A:
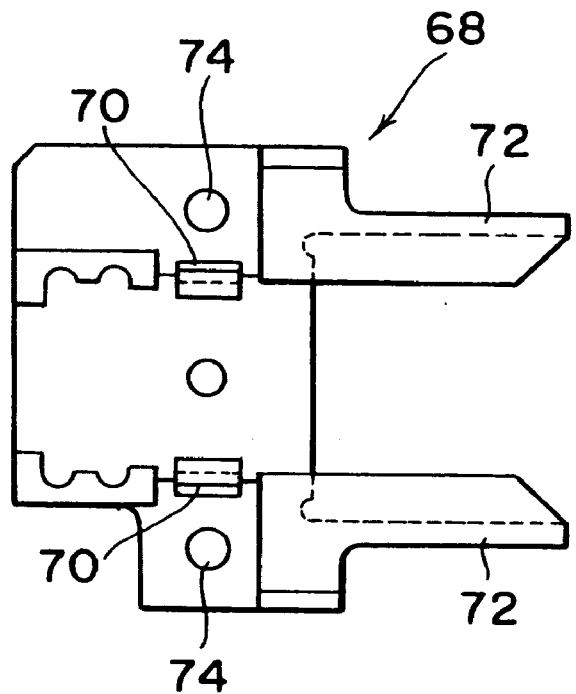
FIG. 11A is a plan view of a holding member of a holder in a second preferred embodiment of the present invention.
Figure 11B:
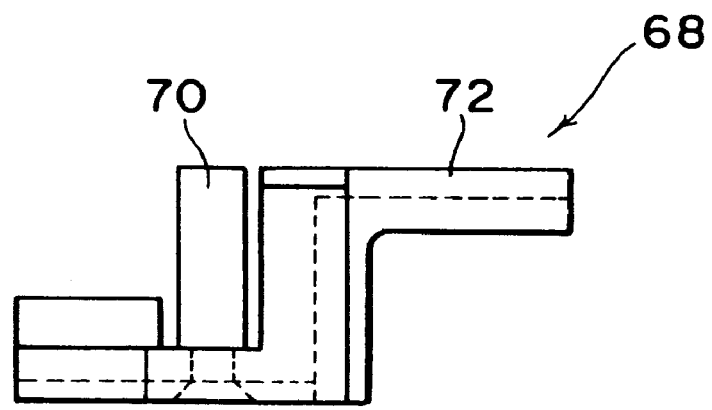
FIG. 11B is an elevational view of FIG. 11A.
Figure 12A:
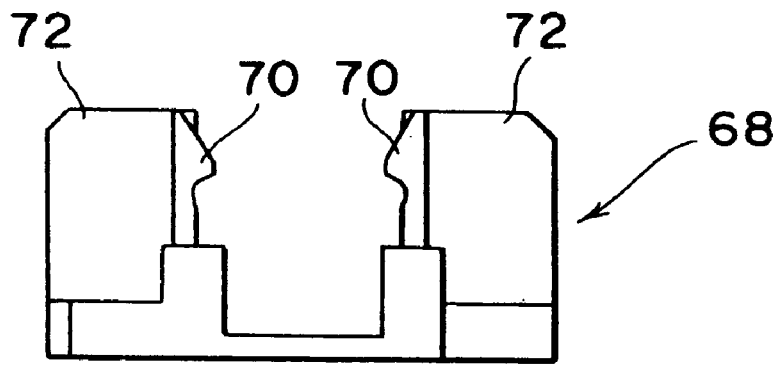
FIG. 12A is a left side view of FIG. 11A.
Figure 12B:
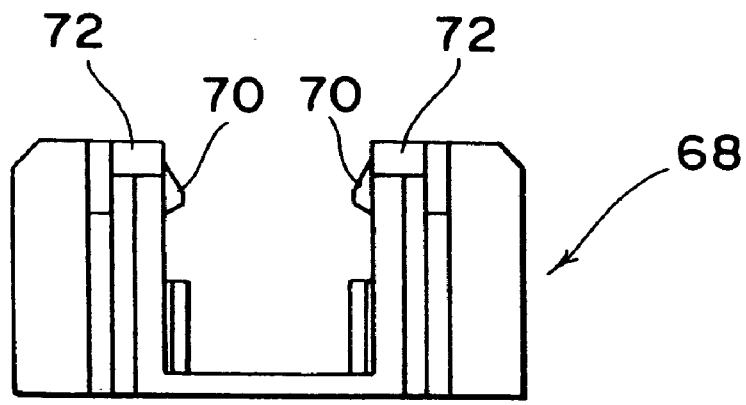
FIG. 12B is a right side view of FIG. 11A.
Figure 13A:
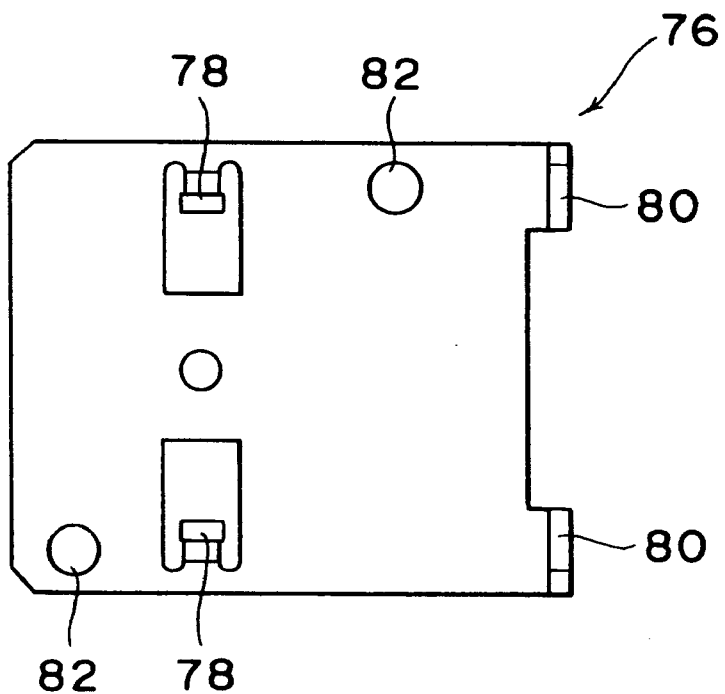
FIG. 13A is a plan view of a base member of the holder in the second preferred embodiment.
Figure 13B:
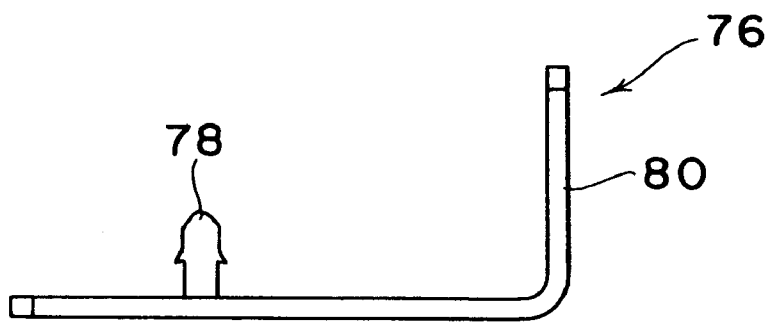
FIG. 13B is an elevational view of FIG. 13A.

The holding member 62 is formed of plastic, and has two holes 63 for assembly in addition to the four holes 32 for fixing as shown in FIG. 7A. The base member 64 is formed of metal such as stainless steel, and has two projections 66 for assembly as best shown in FIGS. 9A and 9B. By inserting the projections 66 of the base member 64 into the holes 63 of the holding member 62, the holder 12 can be simply assembled. The holder 12 thus assembled is fixed to the printed wiring board 8 (see FIG. 1) by using the four holes 32 and associated rivets or the like, and is used for connection of the first optical connector 14 and the second or third optical connector 18 or 56.

Referring to FIGS. 11A to 12B, there is shown a holding member 68 of a holder in a second preferred embodiment of the present invention. The holding member 68 is formed of plastic, and has a pair of holding portions 70 for holding the first optical connector 14, a pair of guides 72 for guiding the adapter 16 or 48, and a pair of holes 74 for assembly.

Figure 14A:
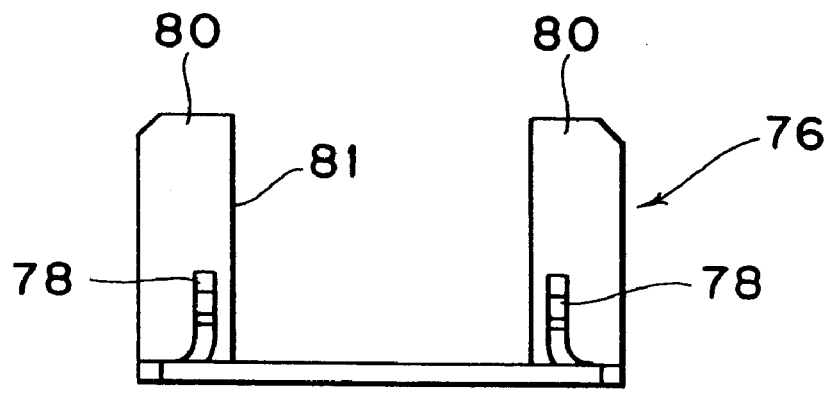
FIG. 14A is a left side view of FIG. 13A.
Figure 14B:
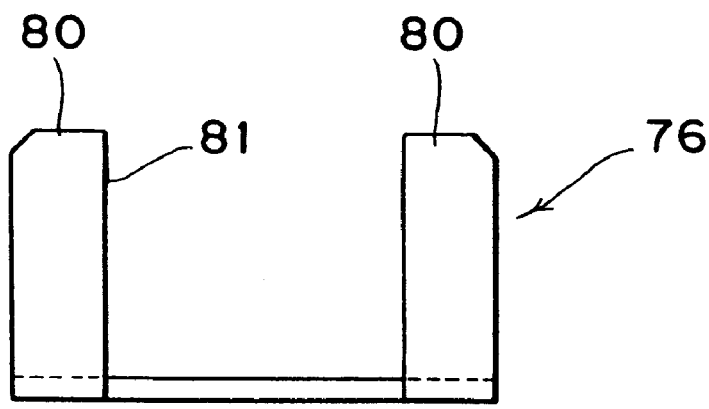
FIG. 14B is a right side view of FIG. 13A.
Figure 15A:
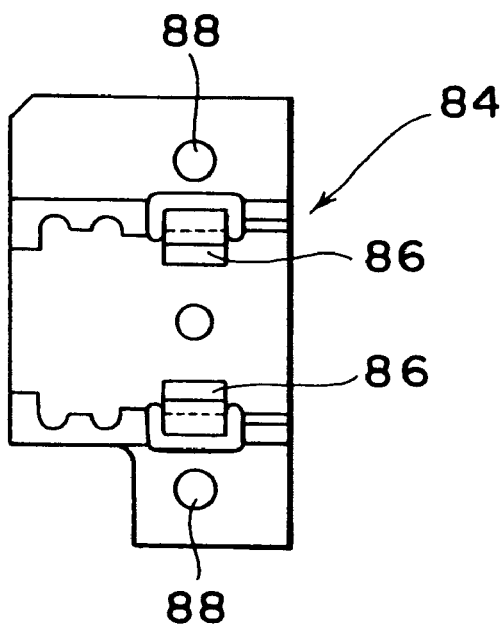
FIG. 15A is a plan view of a holding member of a holder in a third preferred embodiment of the present invention.
Figure 15B:
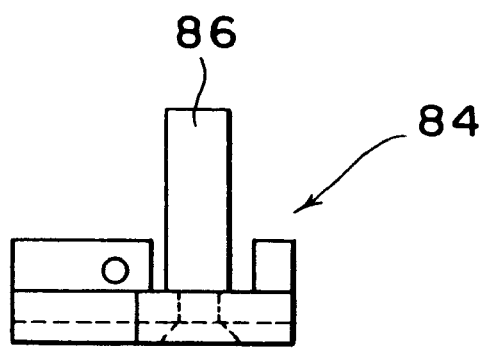
FIG. 15B is an elevational view of FIG. 15A.
Figure 16A:
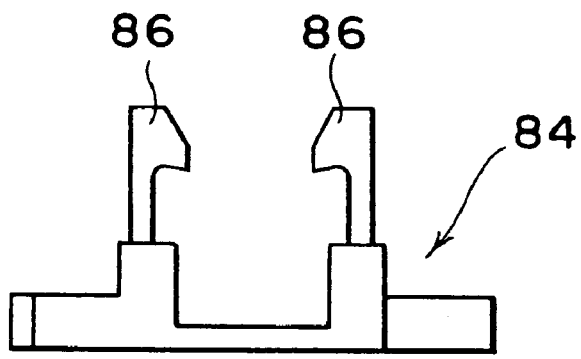
FIG. 16A is a left side view of FIG. 15A.
Figure 16B:
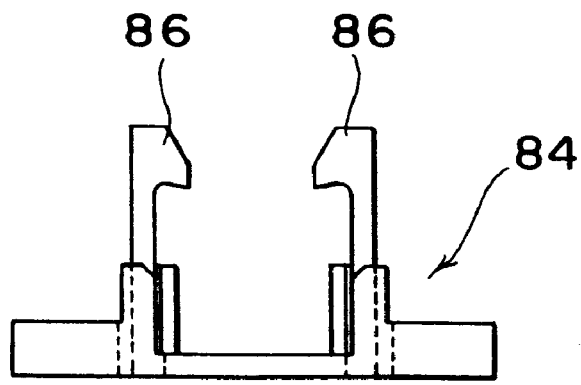
FIG. 16B is a right side view of FIG. 15A.
Figure 17A:
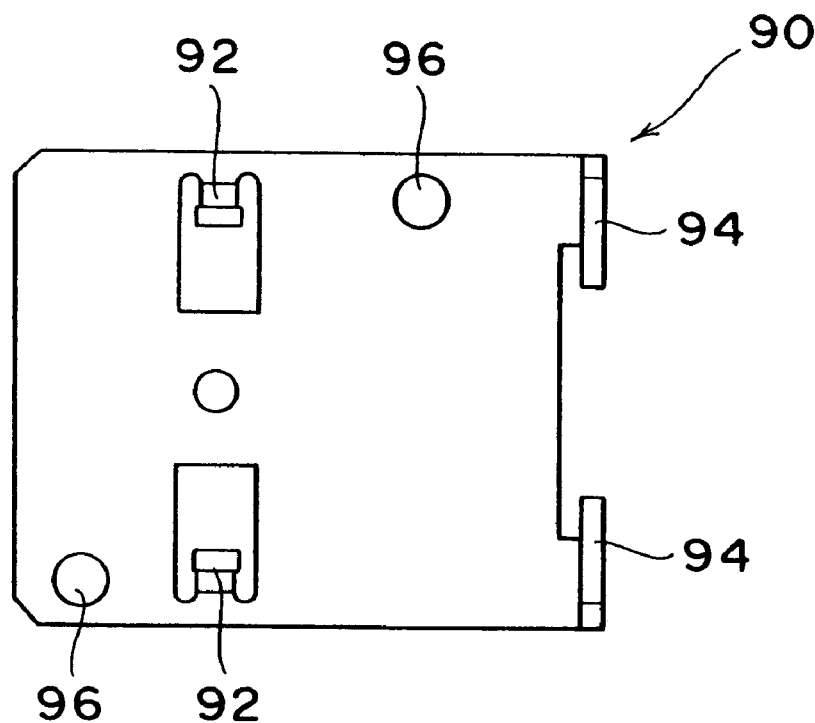
FIG. 17A is a plan view of a base member of the holder in the third preferred embodiment.
Figure 17B:
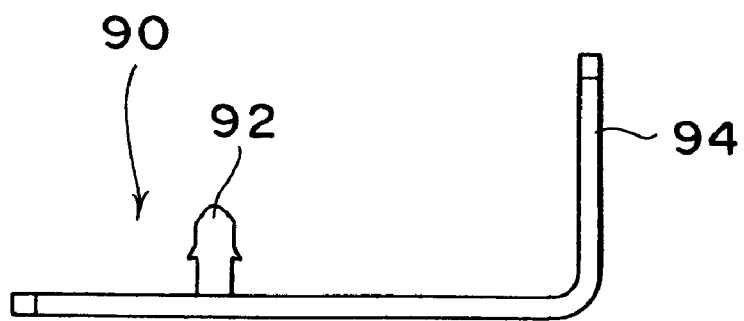
FIG. 17B is an elevational view of FIG. 17A.

Referring to FIGS. 13A to 14B, there is shown a base member 76 of the holder in the second preferred embodiment of the present invention. The base member 76 is formed of metal such as stainless steel, and has a pair of projections 78 for assembly and a pair of rising portions 80. As shown in FIGS. 14A and 14B, an opening 81 for insertion of the adapter 16 or 48 is defined between a pair of rising portions 80. The base member 76 further has two holes 82 for fixing this holder to a printed wiring board. By inserting the projections 78 of the base member 76 through the holes 74 of the holding member 68, the holder in this preferred embodiment can be simply assembled.

Referring to FIGS. 15A to 16B, there is shown a holding member 84 of a holder in a third preferred embodiment of the present invention. The holding member 84 is formed of plastic, and has a pair of holding portions 86 for elastically holding the first optical connector 14 and a pair of holes 88 for assembly.

Figure 18A:
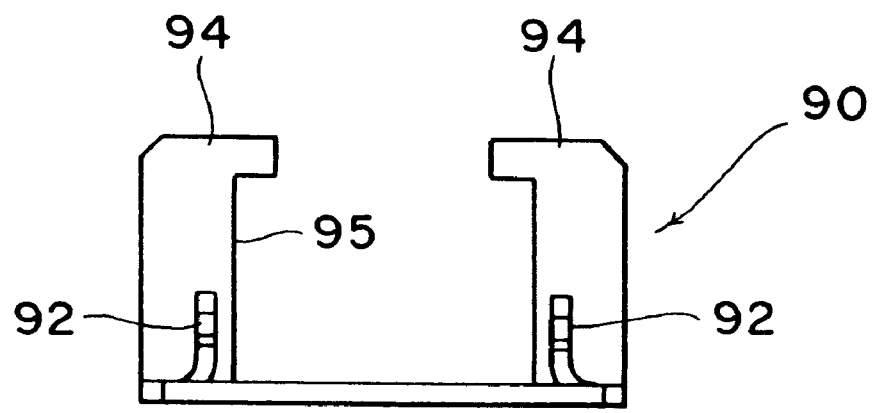
FIG. 18A is a left side view of FIG. 17A.
Figure 18B:
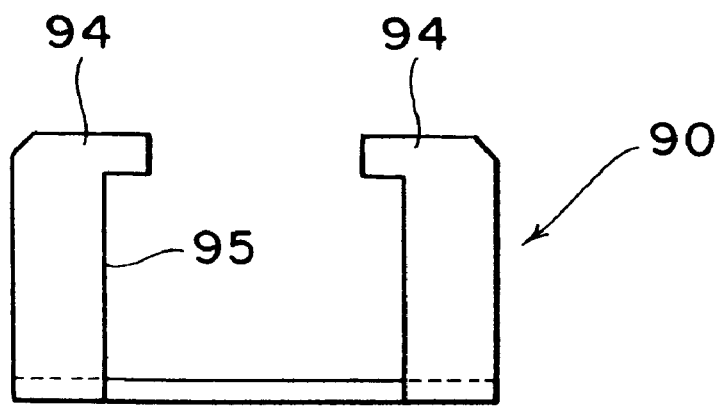
FIG. 18B is a right side view of FIG. 17A.

Referring to FIGS. 17A to 18B, there is shown a base member 90 of the holder in the third preferred embodiment. The base member 90 is formed of metal such as stainless steel, and has a pair of projections 92 for assembly and a pair of rising portions 94. As shown in FIGS. 18A and 18B, an opening 95 for insertion of the adapter 16 or 48 is defined between a pair of rising portions 94. The base member 90 further has two holes 96 for fixing this holder to a printed wiring board. By inserting the projections 92 of the base member 90 through the holes 88 of the holding member 84, the holder in this preferred embodiment can be simply assembled.

Figure 19A:
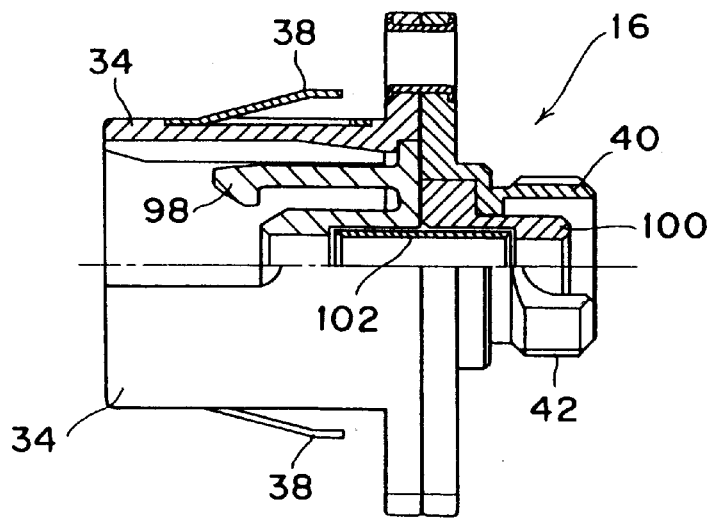
FIG. 19A is a partially sectional plan view of an SC/FC adapter.
Figure 19B:
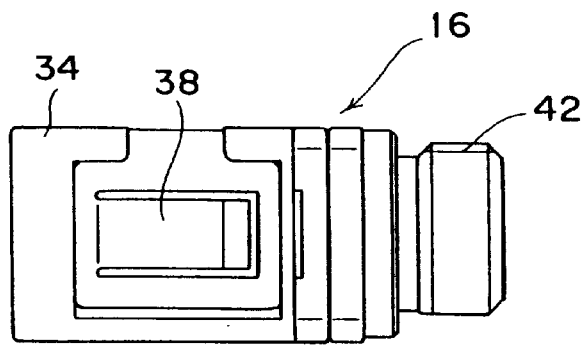
FIG. 19B is an elevational view of FIG. 19A.
Figure 19C:
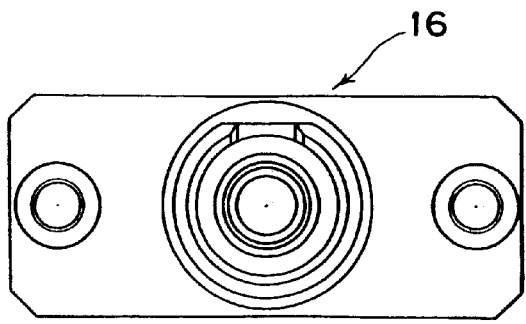
FIG. 19C is a right side view of FIG. 19A.

Referring to FIG. 19A, there is shown a partially sectional plan view of the SC/FC adapter 16. FIG. 19B is an elevational view of FIG. 19A, and FIG. 19C is a right side view of FIG. 19A. As mentioned above, the SC/FC adapter 16 has the SC housing 34 and the FC housing 40 formed on the opposite sides. The SC housing 34 has a pair of leaf springs 38, and the FC housing 40 has the external screw thread 42 on the outer cylindrical surface. A sleeve 98 is inserted in the SC housing 34, and an annular spacer 100 is inserted in the FC housing 40. A slit sleeve 102 formed of zirconia is inserted in the sleeve 98 and the annular spacer 100 to align the ferrules 28 and 46.

Figure 20A:
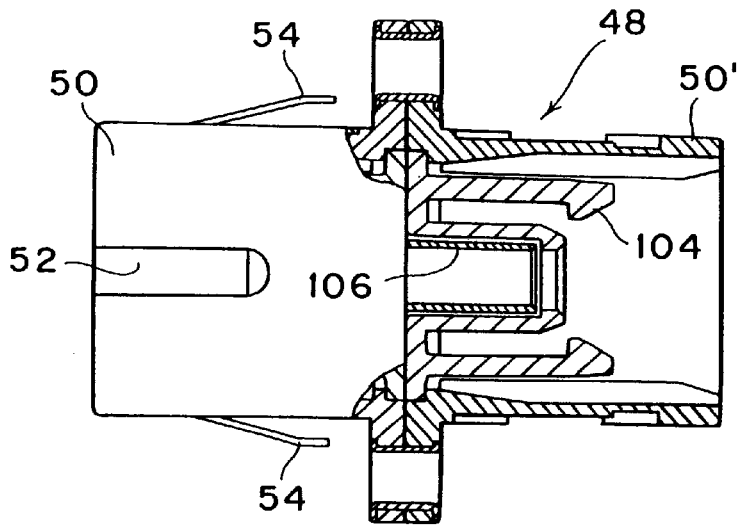
FIG. 20A is a partially sectional plan view of an SC/SC adapter.
Figure 20B:
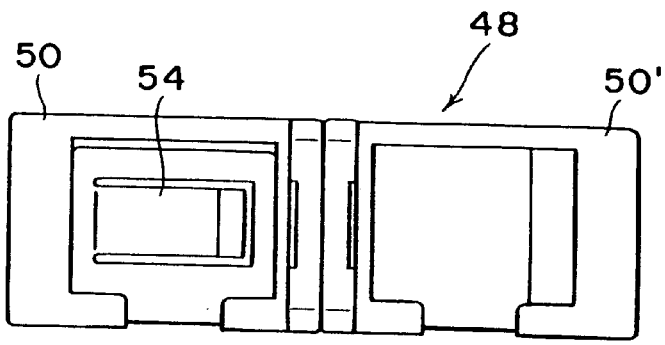
FIG. 20B is an elevational view of FIG. 20A.
Figure 20C:
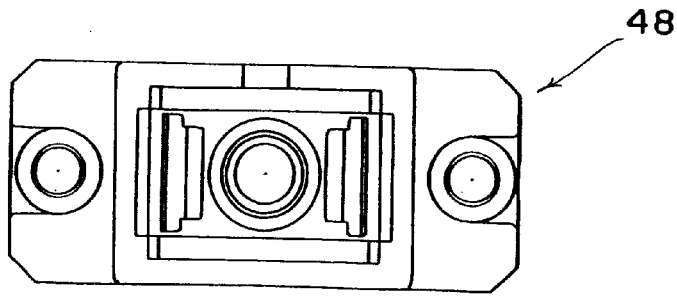
FIG. 20C is a right side view of FIG. 20A.

Referring to FIG. 20A, there is shown a partially sectional plan view of the SC/SC adapter 48. FIG. 20B is an elevational view of FIG. 20A, and FIG. 20C is a right side view of FIG. 20A. As mentioned above, the SC/SC adapter 48 is symmetrical in shape in respect of its longitudinal direction except a pair of leaf springs 54. That is, the SC housing 50 has a pair of leaf springs 54, but the SC housing 50' has no leaf springs. A sleeve 104 is inserted in the SC housing 50', and a sleeve similar to the sleeve 104 is inserted in the SC housing 50. A slit sleeve 106 formed of zirconia is inserted in the sleeve 104 and the sleeve inserted in the SC housing 50 to align the ferrules 28 and 60.

Figure 21A:
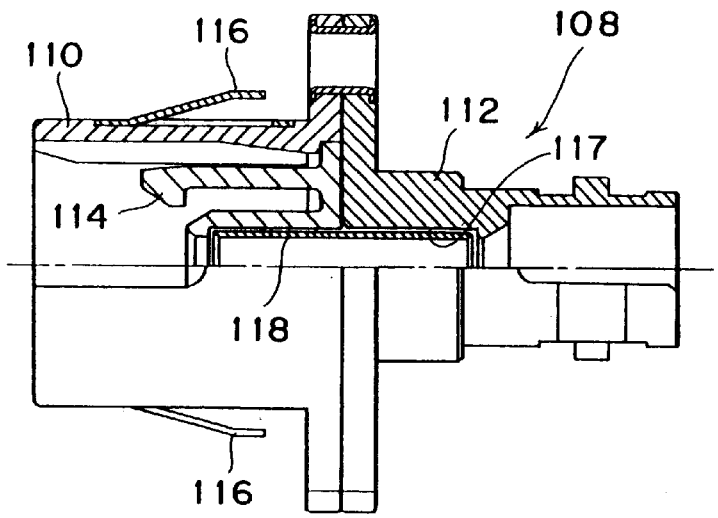
FIG. 21A is a partially sectional plan view of an SC/ST adapter.
Figure 21B:
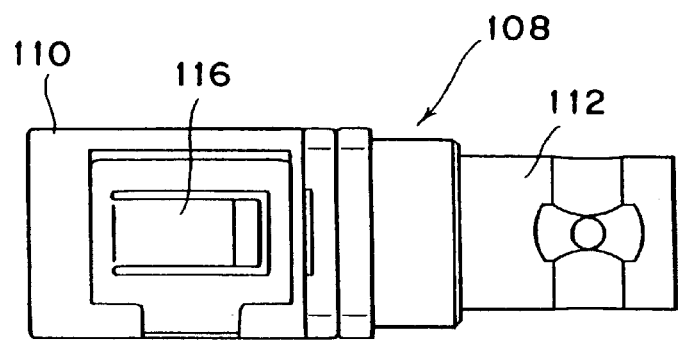
FIG. 21B is an elevational view of FIG. 21A.
Figure 21C:
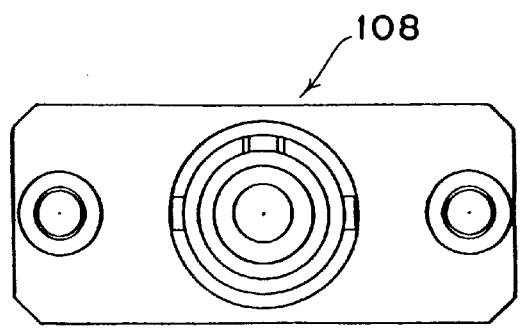
FIG. 21C is a right side view of FIG. 21A.

FIG. 21A is a partially sectional plan view of an SC/ST adapter 108 applicable to the present invention. FIG. 21B is an elevational view of FIG. 21A, and FIG. 21C is a right side view of FIG. 21A. The SC/ST adapter 108 is composed of an SC housing 110 and an ST housing 112 opposite to the SC housing 110. The SC housing 110 has a pair of leaf springs 116. A sleeve 114 is inserted in the SC housing 110. The ST housing 112 has a centered bore 117. A slit sleeve 118 formed of zirconia is inserted in the sleeve 114 and the bore 117 to align the ferrule 20 and a ferrule in an ST connector (not shown).

Figure 22A:
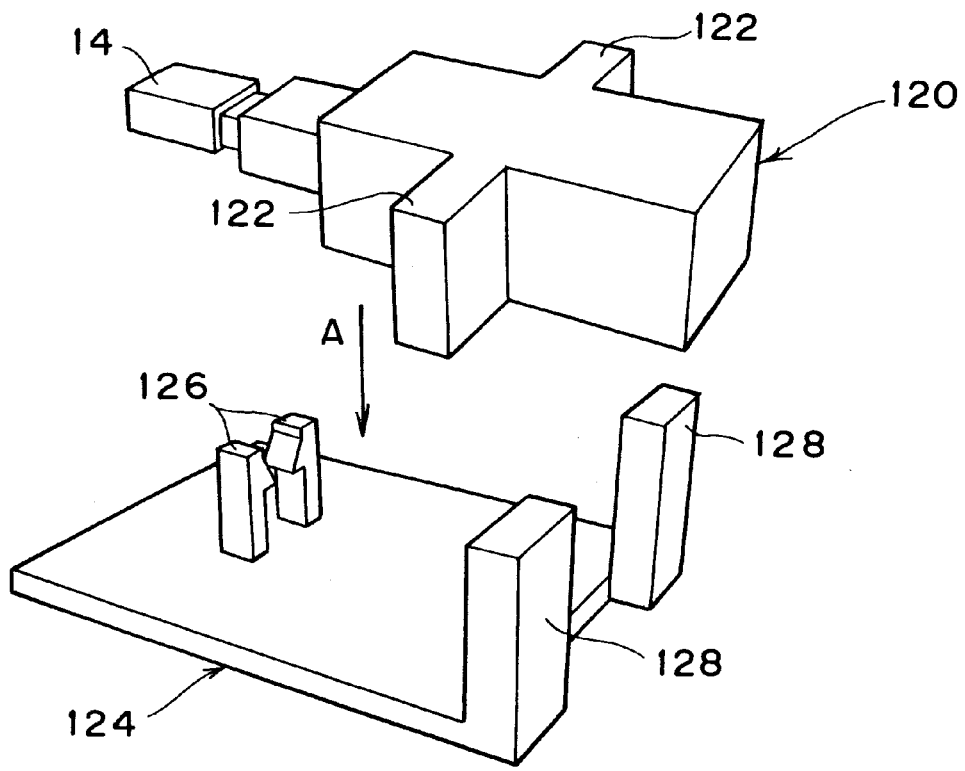
FIG. 22A is an exploded perspective view of an optical connector connecting structure according to a fourth preferred embodiment of the present invention.
Figure 22B:
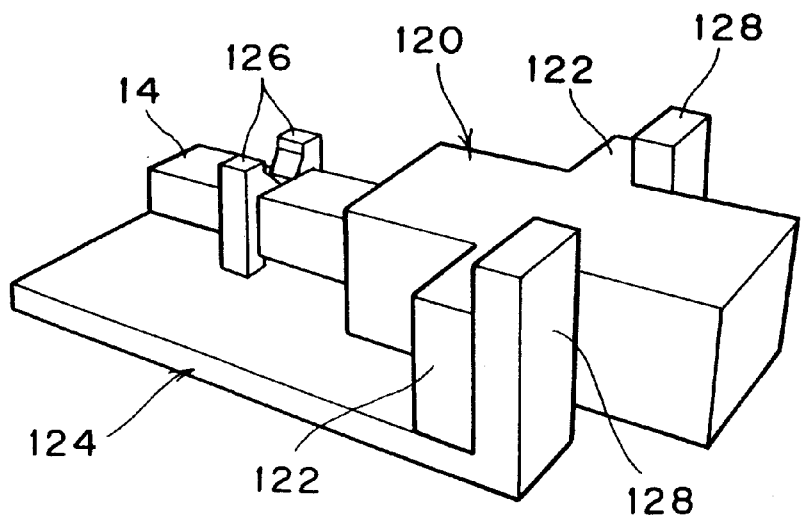
FIG. 22B is a perspective view of the optical connector connecting structure according to the fourth preferred embodiment in its assembled condition.

Referring to FIGS. 22A and 22B, there is shown a schematic perspective view of an optical connector connecting structure according to a fourth preferred embodiment of the present invention. Reference numerals 120 and 124 denote an adapter and a holder, respectively. The adapter 120 has a pair of collars 122, and the first optical connector 14 is engaged with the adapter 120. The holder 124 has a pair of elastic holding portions 126 and a pair of rising portions 128 functioning as a locking means. As shown in FIG. 22A, the adapter 120 with the first optical connector 14 is mounted onto the holder 124 from its upper side as shown by an arrow A in FIG. 22A. Accordingly, the first optical connector 14 is held between a pair of elastic holding portions 126, and the collars 122 of the adapter 120 abut against a pair of rising portions 128 as a locking means, thereby preventing undue removal of the adapter 120 from the first optical connector 14.

Figure 23:
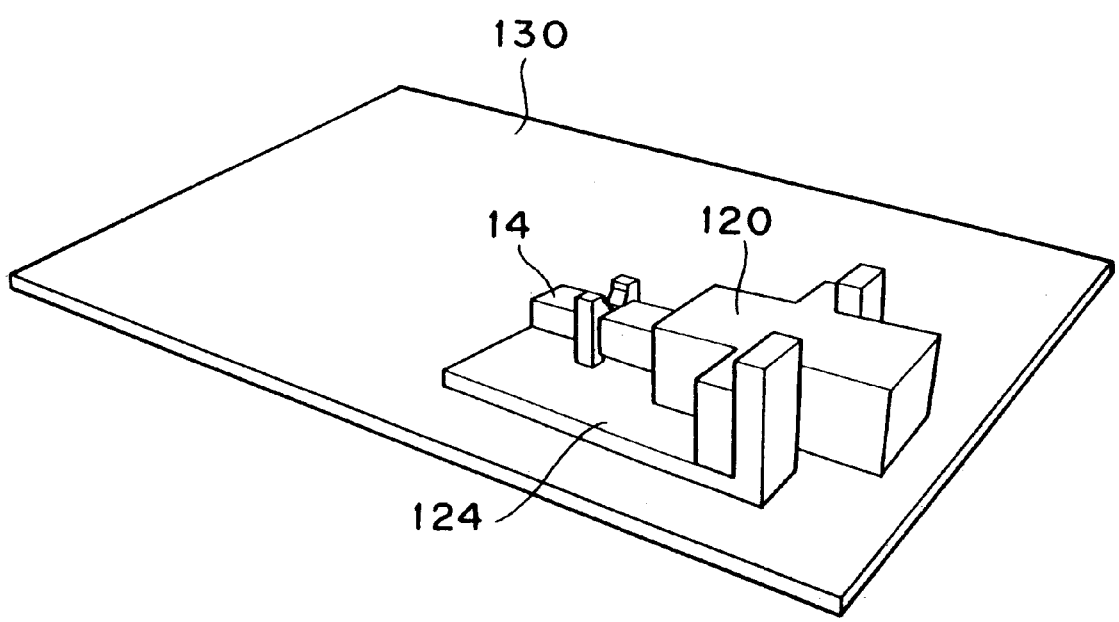
FIG. 23 is a perspective view of the optical connector connecting structure according to the fourth preferred embodiment in the condition where it is mounted on a printed wiring board.

Referring to FIG. 23, there is shown a condition where the optical connector connecting structure shown in FIG. 22B is mounted on a printed wiring board 130. More specifically, the holder 124 is fixed to the printed wiring board 130 by means of rivets or the like. In replacing the adapter 120 with another adapter, the adapter 120 is removed together with the first optical connector 14 from the holder 124 since the adapter 120 has collars 122. The new adapter is next engaged with the first optical connector 14. Then, the assembly of the first optical connector 14 and the new adapter is mounted onto the holder 124.

Figure 24:
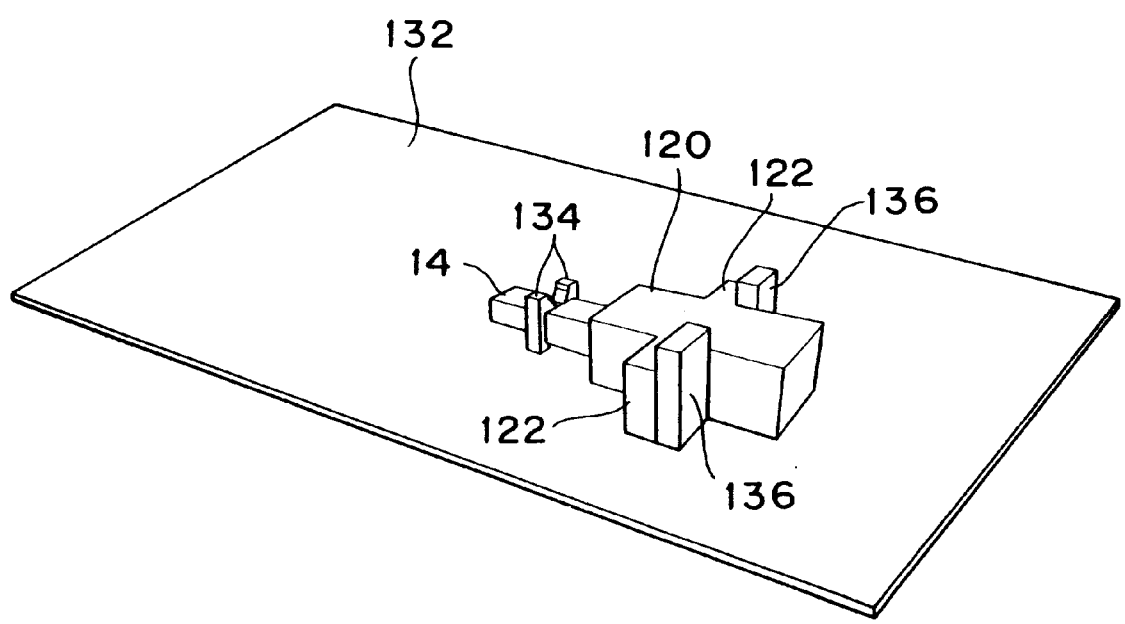
FIG. 24 is a perspective view of an optical connector connecting structure according to a fifth preferred embodiment of the present invention in the condition where it is mounted on a printed wiring board.

Referring to FIG. 24, there is shown a schematic perspective view of an optical connector connecting structure according to a fifth preferred embodiment of the present invention. In this preferred embodiment, a pair of holding portions 134 for holding the first optical connector 14 and a pair of locking elements 136 for locking the adapter 120 are fixed directly to a printed wiring board 132. In mounting the adapter 120 onto the printed wiring board 132, the first optical connector 14 is preliminarily connected to the adapter 120. Then, the adapter 120 with the first optical connector 14 is mounted onto the printed wiring board 132 in such a manner that the first optical connector 14 is held between a pair of holding portions 134. In this condition, the collars 122 of the adapter 120 abut against a pair of locking elements 136, thereby preventing undue removal of the adapter 120 from the first optical connector 14. As a modification, a pair of holding portions 134 and a pair of locking elements 136 may be fixed to a housing (not shown) of the communication device.

Figure 25:
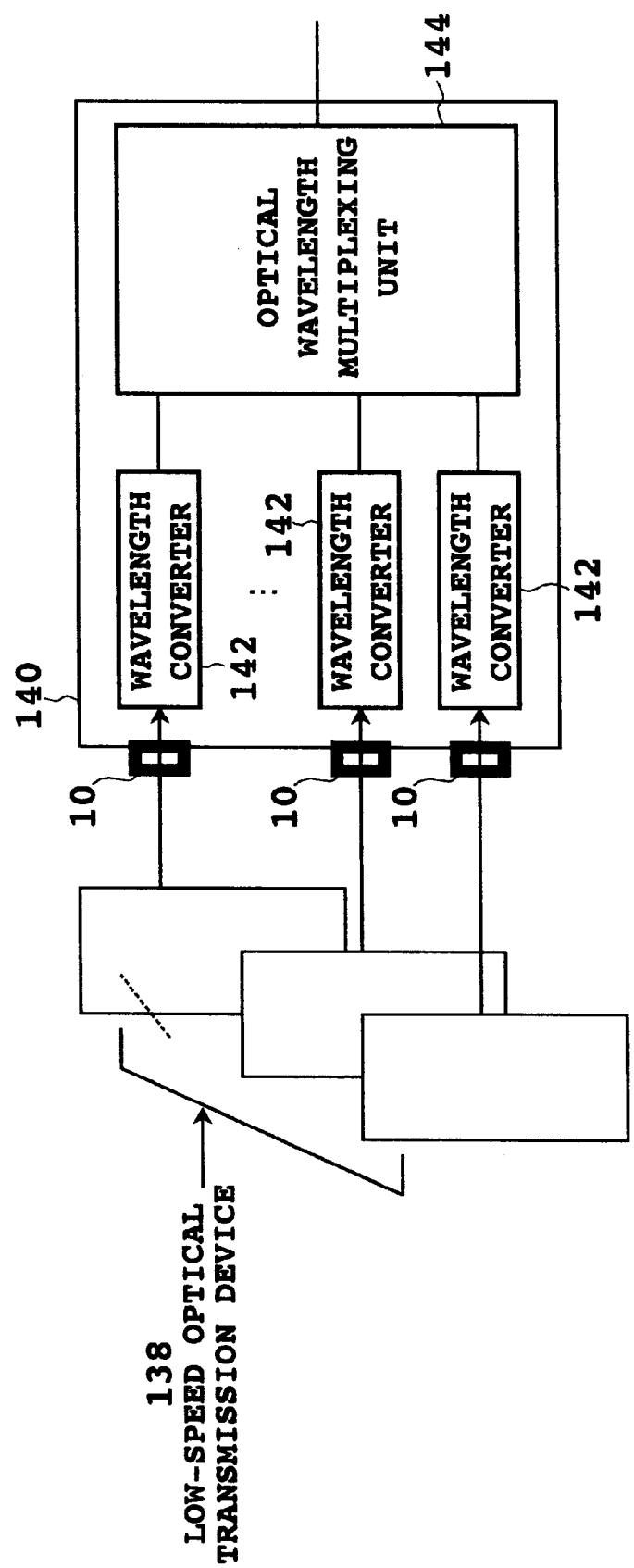
FIG. 25 is a block diagram showing an example of application of the present invention.

Referring to FIG. 25, there is shown a block diagram showing an example of application of the present invention. Reference numeral 138 denotes low-speed optical transmission devices previously installed in a telephone company or the like. Makers of these devices 138 are sometimes different from each other. Reference numeral 140 denotes a transponder including a plurality of wavelength converters 142 and an optical wavelength multiplexing unit 144. The maker of each low-speed optical transmission device 138 may not always the same as that of the transponder 140. Therefore, optical connectors provided on the transponder 140 must be adapted to any types of optical connectors provided on the low-speed optical transmission devices 138. To meet this requirement, the optical connector connecting structure 10 according to the present invention is suitably used to allow easy connection of optical connectors of different types between each low-speed optical transmission device 138 and the corresponding wavelength converter 142.

Figure 26:
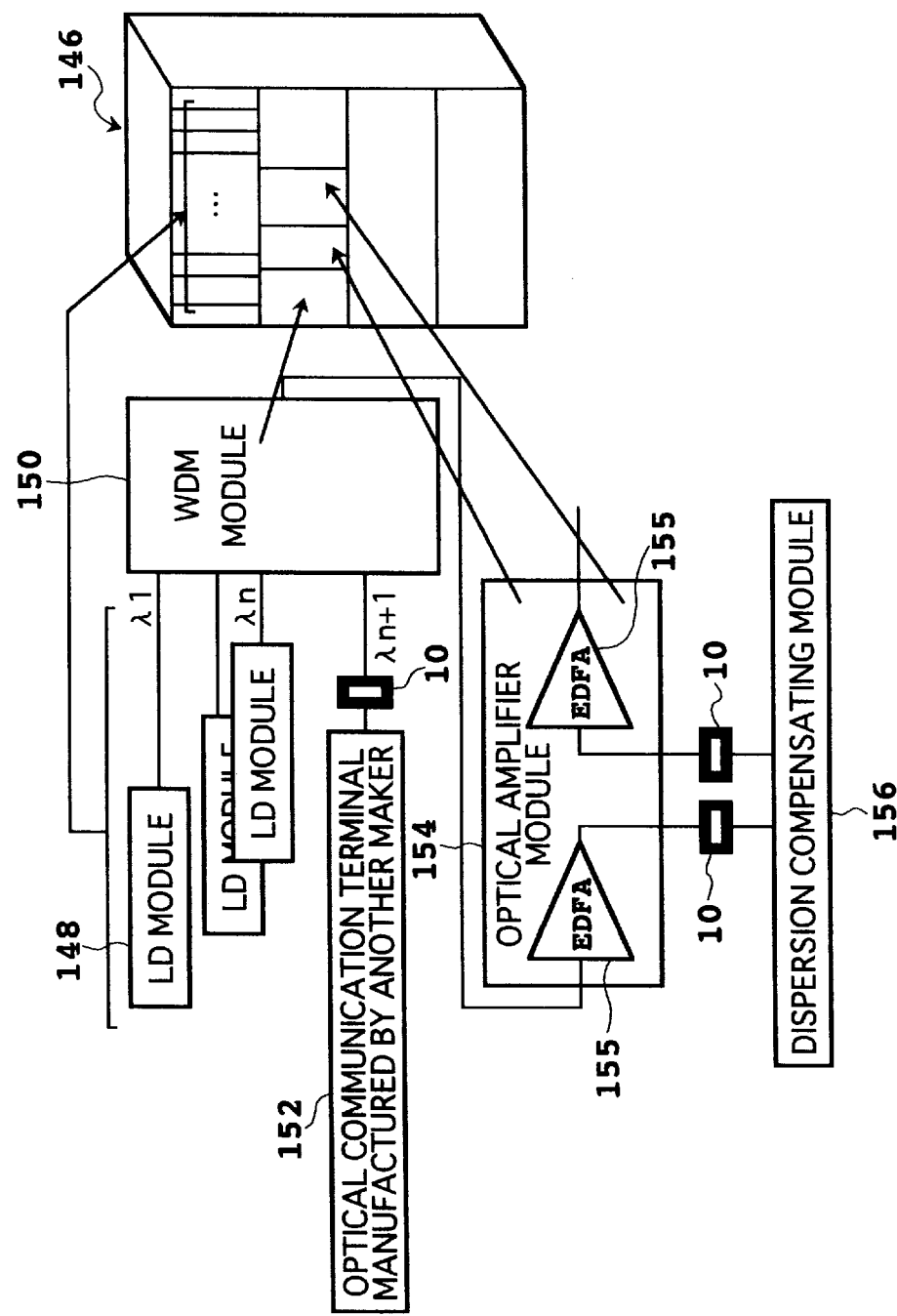
FIG. 26 is a block diagram showing another example of application of the present invention.

Referring to FIG. 26, there is shown a block diagram showing another example of application of the present invention. Reference numeral 146 denotes an optical wavelength multiplexing communication device including a plurality of laser diode modules (LD module) 148, a wavelength division multiplexing module (WDM module) 150, an optical amplifier module 154, and a dispersion compensating module 156. Each LD module 148 is connected to the WDM module 150. Further, an optical communication terminal 152 manufactured by another maker is sometimes connected to the WDM module 150. In this case, the optical connector connecting structure 10 according to the present invention is suitably used to allow easy connection of optical connectors of different types between the optical communication terminal 152 and the WDM module 150.

Further, in the optical amplifier module 154 included in the optical wavelength multiplexing communication device 146, the dispersion compensating module 156 is sometimes necessary between adjacent erbium doped fiber amplifiers (EDFA) 155. The dispersion compensating module 156 is composed of a DCF and optical devices manufactured by a fiber maker, and input/output optical connectors of the dispersion compensating module 156 are sometimes different in shape from those of the optical amplifier module 154. In this case, the optical connector connecting structure 10 according to the present invention is suitably used to allow easy connection of optical connectors of different types between the dispersion compensating module 156 and the optical amplifier module 155.

According to the present invention as described above, the first optical connector is held by the holder, and the adapter is detachably mounted to the first optical connector through the opening of the holder. Accordingly, the adapter can be easily exchanged, and easy connection of optical connectors of different types can be achieved.

What is claimed is:

1. A holder for optically connecting first and second optical connectors through an adapter, comprising:
   holding means for elastically holding said first optical connector; and
   locking means for locking said adapter so as to prevent removal of said adapter from said first optical connector in a condition where said first optical connector is connected with said adapter and wherein said locking means is adapted to lock a leaf spring provided on said adapter.

2. A holder according to claim 1, wherein said adapter is an adapter allowing connection of optical connectors of a same type.

3. A holder according to claim 1, wherein said adapter is an adapter allowing connection of optical connectors of different types.

4. A holder for optically connecting first and second optical connectors through an adapter, comprising:
   holding means for elastically holding said first optical connector;
   locking means for locking said adapter so as to prevent removal of said adapter from said first optical connector in a condition where said first optical connector is connected with said adapter and wherein said locking means is adapted to lock a leaf spring provided on said adapter, said holding means and said locking means are integrated with each other.

5. A holder for optically connecting first and second optical connectors through an adapter, comprising:
   holding means for elastically holding said first optical connector;
   locking means for locking said adapter so as to prevent removal of said adapter from said first optical connector in a condition where said first optical connector is connected with said adapter and wherein said locking means is adapted to lock a leaf spring provided on said adapter; and
   said holder further comprising:
      means for fixing said holder to a printed wiring board.

6. An optical connector connecting structure for optically connecting first and second optical connectors through an adapter to obtain an assembly and fixing said assembly to a printed wiring board, comprising:
   holding means fixed to said printed wiring board for elastically holding said first optical connector; and
   locking means fixed to said printed wiring board for locking said adapter so as to prevent removal of said adapter from said first optical connector in a condition where said first optical connector is connected with said adapter.

7. An optical connector connecting structure for optically connecting first and second optical connectors through an adapter to obtain an assembly and fixing said assembly to a printed wiring board, comprising:
   a holder fixed onto said printed wiring board, said holder having holding means for elastically holding said first optical connector and locking means for locking said adapter so as to prevent removal of said adapter from said first optical connector in a condition where said first optical connector is connected with said adapter.

8. An optical connector connecting structure for a communication device, comprising:
   a holder fixed to said communication device and having a pair of optical connector holding members and an adapter insertion opening;
   a first optical connector held by said optical connector holding members; and
   an adapter inserted through said opening of said holder and detachably mounted to said first optical connector, wherein said adapter has a pair of leaf springs for engaging said holder to prevent removal of said adapter from said first optical connector in a condition where said first optical connector is connected with said adapter.

9. An optical connector connecting structure according to claim 8, wherein:
   said adapter is an adapter allowing connection of optical connectors of a same type;
   said optical connector connecting structure further comprising a second optical connector of the same type as that of said first optical connector, said second optical connector being inserted into said adapter from opposite side of said first optical connector.

10. An optical connector connecting structure according to claim 8, wherein:
    said adapter is an adapter allowing connection of optical connectors of different types;
    said optical connector connecting structure further comprising a second optical connector of the type different from that of said first optical connector, said second optical connector being inserted into said adapter from opposite side of said first optical connector.

11. An apparatus for optically connecting first and second optical connectors through an adapter, comprising:
    a holder elastically holding said first optical connector; and
    a lock locking said adapter so as to prevent removal of said adapter from said first optical connector in a condition where said first optical connector is connected with said adapter and wherein said lock is adapted to lock a leaf spring provided on said adapter.

12. An apparatus for optically connecting first and second optical connectors through an adapter, comprising:
    a holder elastically holding said first optical connector; and
    a lock locking said adapter so as to prevent removal of said adapter from said first optical connector in a condition where said first optical connector is connected with said adapter and wherein said lock is adapted to lock a leaf spring provided on said adapter, said holder and lock are integrated with each other.

13. An apparatus for optically connecting first and second optical connectors through an adapter, comprising:
    a holder elastically holding said first optical connector; and
    a lock locking said adapter so as to prevent removal of said adapter from said first optical connector in a condition where said first optical connector is connected with said adapter and wherein said lock is adapted to lock a leaf spring provided on said adapter; and
    said holder further comprising:
       means for fixing said holder to a printed wiring board.

14. An apparatus comprising:
    a holding unit optically connecting first and second optical connectors through an adapter, said holding unit elastically holds said first optical connector; and
    a locking unit locking said adapter to prevent removal of said adapter from said first optical connector in a condition where said first optical connector is connected with said adapter and wherein said locking unit is adapted to lock a leaf spring provided on said adapter.

15. An apparatus comprising:
    an optical connecting device optically connecting a first and second optical connector through an adapter to fix an assembly to a printing wiring board, said optical connecting device fixed to said printing wiring board for elastically holding said first optical connector; and
    a locking device fixed to said printing wiring board for locking said adapter so as to prevent removal of said adapter from first optical connector in a condition where said first optical connector is connected with said adapter.

16. An apparatus comprising:
    a holder fixed to a communication device and having a pair of optical connector holding members and an adapter insertion opening, wherein a first optical connector is held by said optical connector holding members; and an adapter inserted through said opening of said holder and detachably mounted to said first optical connector, wherein said adapter has a pair of leaf springs for engaging said holder to prevent removal of said adapter from said first optical connector in a condition where said first optical connector is connected with said adapter.

* * * * *